US009244568B2

(12) United States Patent
Philipp (10) Patent No.: US 9,244,568 B2
(45) Date of Patent: Jan. 26, 2016

(54) TOUCH SCREEN SENSOR (75) Inventor: Harald Philipp, Hamble (GB)

(73) Assignee: Atmel Corporation, San Jose, CA (US)

( * ) Notice: Subject to any disclaimer, the term of this patent is extended or adjusted under 35 U.S.C. 154(b) by 122 days.

(21) Appl. No.: 12/421,696

(22) Filed: Apr. 10, 2009

(65) Prior Publication Data

US 2010/0123670 A1    May 20, 2010

Related U.S. Application Data (60) Provisional application No. 61/115,032, filed on Nov. 15, 2008.

(51) Int. Cl.
G06F 3/041 (2006.01)
G06F 3/044 (2006.01)

(52) U.S. Cl.
CPC ...... *G06F 3/044* (2013.01); *G06F 2203/04112* (2013.01); *Y10T 29/4913* (2015.01)

(58) Field of Classification Search
CPC ............ G06F 2203/4112; G06F 3/044; Y10T 29/4913
USPC ........................................................ 345/173
See application file for complete search history.

(56) References Cited

U.S. PATENT DOCUMENTS

| 4,659,874 | A  | 4/1987  | Landmeier     |
|-----------|----|---------|---------------|
| 6,222,522 | B1 | 4/2001  | Mathews et al.|
| 6,288,707 | B1 | 9/2001  | Philipp       |
| 6,297,811 | B1 | 10/2001 | Kent et al.   |
| 6,452,514 | B1 | 9/2002  | Philipp       |
| 6,466,036 | B1 | 10/2002 | Philipp       |
| 7,129,935 | B2 * | 10/2006 | Mackey ........................ 345/174 |
| 7,663,607 | B2 | 2/2010  | Hotelling     |
| 7,875,814 | B2 | 1/2011  | Chen          |
| 7,920,129 | B2 | 4/2011  | Hotelling     |
| 8,031,094 | B2 | 10/2011 | Hotelling     |
| 8,031,174 | B2 | 10/2011 | Hamblin       |
| 8,040,326 | B2 | 10/2011 | Hotelling     |
| 8,049,732 | B2 | 11/2011 | Hotelling     |

(Continued)

FOREIGN PATENT DOCUMENTS

| DE | 2007006407 | 4/2007 |
| EP | 1837742 A2 | 9/2007 |

(Continued)

OTHER PUBLICATIONS

Atmel Corporation, "Touch Sensors Design Guide"; Jan. 22, 2009; http://www.atmel.com/dyn/resources/prod_documents/doc10620.pdf.

(Continued)

*Primary Examiner* — Yong H Sim
(74) *Attorney, Agent, or Firm* — Baker Botts L.L.P.

(57) ABSTRACT

A two-dimensional touch sensor comprising a plurality of electrodes arranged in a mesh pattern on a substrate. Each electrode is formed by interconnected metal traces, the metal being intrinsically opaque, but the metal traces being sufficiently narrow to be practically invisible. The metal traces have a width less than or equal to 10 μm and occupy less than or equal to 5% of the area of each electrode. The electrodes can be deposited additively via a printing process, for example using copper as the metal. The narrow width of the tracks allows the film to be highly transparent, since the electric field used in capacitive touch screens can be made to propagate with very low metal densities.

37 Claims, 7 Drawing Sheets

(56) References Cited

U.S. PATENT DOCUMENTS

| | | |
|---|---|---|
| 8,179,381 B2 * | 5/2012 | Frey et al. .................. 345/174 |
| 2002/0130605 A1 | 9/2002 | Mueller et al. ............... 313/310 |
| 2003/0234770 A1 | 12/2003 | MacKey |
| 2007/0018969 A1 | 1/2007 | Chen et al. |
| 2007/0257894 A1 * | 11/2007 | Philipp .................. 345/173 |
| 2007/0279395 A1 | 12/2007 | Philipp |
| 2008/0014528 A1 | 1/2008 | Bailey et al. |
| 2008/0158183 A1 | 7/2008 | Hotelling et al. |
| 2008/0246496 A1 | 10/2008 | Hristov et al. |
| 2009/0002337 A1 | 1/2009 | Chang |
| 2009/0219258 A1 * | 9/2009 | Geaghan et al. ............. 345/173 |
| 2009/0250268 A1 * | 10/2009 | Staton et al. ............. 178/18.06 |
| 2009/0315854 A1 | 12/2009 | Matsuo |
| 2010/0026655 A1 * | 2/2010 | Harley ................... 345/174 |
| 2010/0156840 A1 * | 6/2010 | Frey et al. ............... 345/174 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0038572 A1 | 2/2013 | Frey et al. |
| 2013/0076612 A1 | 3/2013 | Myers |

FOREIGN PATENT DOCUMENTS

| | | | |
|---|---|---|---|
| FR | 2925717 A1 | 6/2009 | |
| JP | 2004-192093 A | 7/2004 | ............. G06F 3/033 |
| JP | 2006-344163 A | 12/2006 | ............. G06F 3/041 |
| JP | 2007-048278 A | 2/2007 | ............. G06F 3/046 |
| JP | 2007-533044 A | 11/2007 | ............. G06F 3/041 |
| JP | 2008-149681 | 7/2008 | ............. B32B 15/08 |
| JP | 2010-039537 | 2/2010 | ............. G06F 3/041 |
| JP | 2011-513846 A | 4/2011 | ............. G06F 3/041 |
| WO | WO-0073984 A1 | 12/2000 | |
| WO | WO 2006/088059 | 8/2006 | ............. H05K 9/00 |
| WO | WO 2012/129247 | 9/2012 | |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
"International Application Serial No. PCT/US2009/064483, Search Report mailed Feb. 23, 2010", 4 pgs.
"International Application Serial No. PCT/US2009/064483, Written Opinion mailed Feb. 23, 2010", 5 pgs.
Chinese State Intellectual Property Office, "First Office Action of China State Intellectual Property Office," Office Action in Chinese, 200980145532.1, 9 pages, Apr. 24, 2013.
Chinese State Intellectual Property Office, "First Office Action of China State Intellectual Property Office," Office Action, English Translation, 200980145532.1, 8 pages, Apr. 24, 2013.
JP Third Party Opinion (English Translation) for Application No. 098138457, Oct. 17, 2013.
JPO Official Action, Decision of Final Rejection and English Translation for Application No. 2011-536545; dispatch No. 379695, Jul. 14, 2014.
Notification for Reason(s) for Rejection for Patent Application No. 2011/536545, Dec. 2, 2013.
JP Third Party Opinion, Nov. 20, 2013.

* cited by examiner

TOUCH SCREEN SENSOR

BACKGROUND OF THE INVENTION

The present invention relates to the manufacture and application of capacitive touch screen electrode layers by the use of single layer fine-line metal mesh electrodes printed onto a substrate. The method includes a simple way to self-test the electrodes from a connector so as to avoid the need for more elaborate test methodologies.

Most touch screens today, capacitive or otherwise, use a sputtered layer of Indium Tin Oxide (ITO) deposited onto a thin plastics film (such as PET film) or directly onto a glass layer. The ITO is uniformly deposited then etched using a subtractive process which involves numerous process steps. Finally, layers of silver ink and dielectric are used to make connections to the ITO on film or glass, which adds yet more process steps.

ITO films are clear to about 92% (single layer), but have a relatively high resistance and are known to be quite fragile. A relatively high percentage of films become damaged during production, requiring an expensive and time-consuming test stage. Also, ITO films are expensive and there are only a few suppliers who can competently manufacture such films, causing logistical problems for users of these films. Finally, Indium is a scarce metal which is increasingly in demand, yet production of this metal is limited by the few mines which produce it.

Other materials can replace these films, such as poly(3,4-ethylenedioxythiophene) or PEDOT conductive polymer. However PEDOT is not as optically clear as ITO, is difficult to deposit uniformly, and degrades rapidly under adverse environmental conditions.

Therefore there is a need for a new material and/or method for producing touch screens which overcomes the above limitations.

SUMMARY OF THE INVENTION

The invention provides an improved touch sensor comprising a substrate with a sensitive area defined by a pattern of conductive electrodes arranged in a mesh pattern.

The invention, in its most inexpensive form, comprises the use of fine-line printed metal deposited additively via a printing process onto a PET layer. It is now possible to inexpensively print metal traces that are highly conductive using copper, which are 10 µm wide or less. The narrow width of these tracks allows the film to be highly transparent, since the electric field used in capacitive touch screens can be made to propagate with very low metal densities. In tests, it has been found that fine line electrodes comprising less than 5% metal coverage of the total screen area, are nearly as effective in propagating fields as the solid surfaces they replace. In addition to copper, other metals or alloys thereof with high electrical conductivity may also be used, for example silver or gold.

As a result, a mesh of fine metal lines of about 10 µm width can be applied to a substrate such as PET film, which is 98% clear, better than ITO. The metal lines are so narrow as to be optically invisible. Also, the mesh configuration allows for robust performance, since a break in the metal is 'cured' by alternate paths around the defect. Furthermore, copper is malleable unlike ITO and can be readily flexed or kinked without damage. Unlike PEDOT, fine line copper has no problems with environmental deterioration under normal conditions of anticipated use.

The method applies to single-layer and two-layer film designs, the latter being commonly employed for higher resolution and for multi-touch sensing applications. Any number of pattern designs can be used.

Self-test is also optionally incorporated by the use of loopback testing built into a film as will be described hereinafter.

One aspect of the invention provides a two-dimensional touch sensor comprising a plurality of electrodes arranged in a pattern on a substrate, each electrode being formed of an interconnected mesh of metal traces, the metal being intrinsically opaque, but the metal traces being sufficiently narrow to be practically invisible.

The metal traces preferably have a width less than or equal to 10 µm, or alternatively less than or equal to 50 µm, 40 µm, 30 µm, 20 µm or 5 µm.

The metal traces preferably occupy less than or equal to 5% of the area of each electrode, or alternatively less than or equal to 10%, 8%, 6%, 4%, 2% or 1% of the area of each electrode.

In some embodiments, the electrodes are arranged in a single layer. In other embodiments, the electrodes are arranged in two layers, the two layers being separated by a dielectric.

Adjacent electrodes may be spaced apart by a plurality of islands also made of interconnected metal traces, the metal traces of the islands being visually and electrically similar to the metal traces of the electrodes. These islands in-fill between electrodes to provide visual continuity.

To provide a self-test capability, each electrode is preferably subdivided into upper and lower parts, in that the metal traces from the upper and lower parts are connected only at a distal end of the electrode, there being no connection between metal traces in the upper and lower parts from the distal end to first and second proximal ends of the electrode. First and second electrical connections for each electrode are connected to respective first and second proximal ends thereof. If the electrode pattern is rotated through an angle of 90 degrees the upper and lower parts of each electrode may be referred to as the left and right parts respectively.

In some embodiments, there are a plurality of X electrodes spaced apart by a plurality of Y electrodes. The second proximal end of each X electrode is electrically connected to the first proximal end of the adjacent X electrode via a resistive element. The second proximal end of each Y electrode is electrically connected to the first proximal end of the adjacent Y electrode.

Another aspect of the invention provides a method of manufacturing a capacitive touch sensor, the method comprising the steps of: providing a substrate; and depositing a plurality of electrodes on at least one side of the substrate, each electrode being formed of an interconnected mesh of metal traces, the metal being intrinsically opaque, but the metal traces being sufficiently narrow and of low visual density so as to be practically invisible.

Each electrode is advantageously subdivided into upper and lower parts, in that the metal traces from the upper and lower parts are connected only at a distal end of the electrode, there being no connection between metal traces in the upper and lower parts from the distal end to first and second proximal ends of the electrode. The upper and lower parts of each electrode may also be referred to as left and right parts respectively.

The invention in another aspect covers a method of testing a capacitive touch sensor manufactured as above, comprising: applying a first voltage to the first proximal end of one of the plurality of electrodes while connecting the proximal ends of all other electrodes to ground and measuring a second voltage at the second proximal end of the one electrode; repeating the previous step for all other electrodes; and failing the sensor if the second voltage is anomalously low compared to the first voltage for any of the electrodes, and passing the sensor otherwise. This provides self-test by the use of loop-back testing around the loop formed by each 'split' electrode.

BRIEF DESCRIPTION OF THE DRAWINGS

For a better understanding of the invention and to show how the same may be carried into effect reference is now made by way of example to the accompanying drawings.

DETAILED DESCRIPTION

Processes have been recently developed which allow the printing of ultra-fine metal traces on plastic films and glass, as thin as 10 µm or even less. The metals used include copper, which is highly conductive and has a darker color than other metals, for example chrome. The technology has been developed using standard photolithographic processes and can be used to mass produce films on a roll-to-roll process for extremely low cost. No expensive, rare, or exotic materials are used in the manufacture of these metal traces. The technology has been developed specifically for use in microcircuit applications, for example RFID tags, smart cards, displays, and the like.

These fine metal traces can also be used to develop field-emitting structures, using a sparse mesh configuration which has been shown to emit copious amounts of electric field, almost the same as a solid electrode shape. A sparse mesh allows for high optical clarity; if the traces are 10 µm or less, and the mesh covers only 5% of the surface area, the optical properties will equal or exceed the best available ITO films which can only achieve 93% light transmission. Visually the film will only appear to have an extremely light shade of gray, imperceptible to the untrained eye. At 10 micrometers, the metal traces are invisible to the naked eye. A uniform density or uniform sparse distribution of these traces over the surface of a touch screen would not generate a noticeable visual pattern.

However, it is usually advisable to have a substantial gap between the electrodes to allow for proper field propagation. These gaps can create a visual effect by showing up as lighter areas; as a consequence, it is desirable to 'fill in' these areas with fine lines of a similar density as the electrode areas. The caveat is that these fill areas should be disconnected from the electrodes and broken up into small islands or made up of isolated small metal traces, so that the average density across the screen area is visually similar.

Figure 1A:
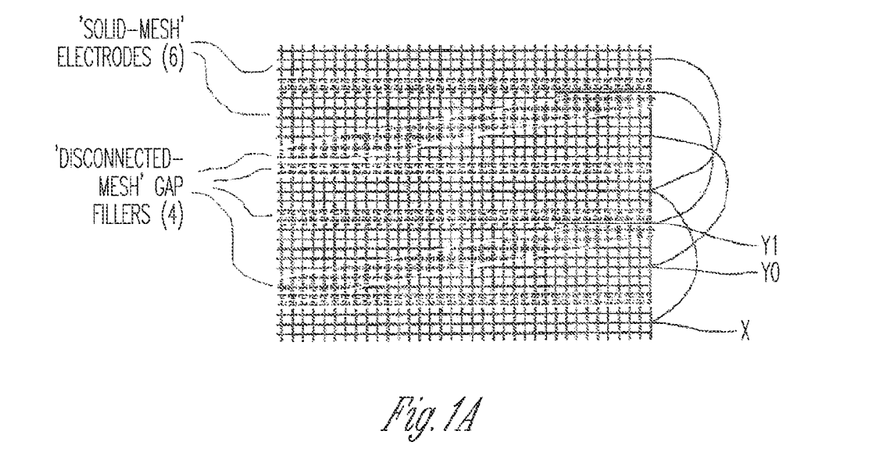
FIG. 1A shows a single-layer design according to an embodiment of the invention.

FIG. 1A shows a basic pattern according to the invention, with horizontal bars of mesh labeled X which are connected together, to form one of the field electrode groupings, and two sets of mesh triangles, one extending from each side, labeled Y0 and Y1. The bars X and triangles Y0, Y1 are solid mesh electrodes 6. Also shown are spacer areas composed of disconnected mesh 4, having an areal density approximating the electrode mesh areas. Where cuts have been made in the mesh to isolate each small cell, some metal tracking is added to compensate for the metal missing in the cuts. The pattern as shown still has visual gap areas which can be fixed by the use of more judicious artwork design.

Triangles Y0, Y1 and bars X of metallic material 6 are shown in the figure, together with spacer areas. The spacer areas may be unfilled or void of any metal pattern so as to allow electric fields to propagate optimally into an overlying panel during use. However, the metal mesh, while largely transparent, would under certain light conditions cause the gap or spacer areas to become more noticeable, even though the lines themselves are too fine to be visible.

Accordingly, the spacer areas may be optionally filled with a metal pattern 4 that mimics the metal mesh electrode areas, but in such a manner as to provide an electrical discontinuity with the electrode areas. The spacer areas 4 contain metal filling that is 'disconnected' so that all the small metal segments are floating. The metal is shaped so that the average density of the spacer areas is approximately the same as the electrode areas so that visually the spacer areas blend in and cannot be distinguished from the electrodes.

Figure 1B:
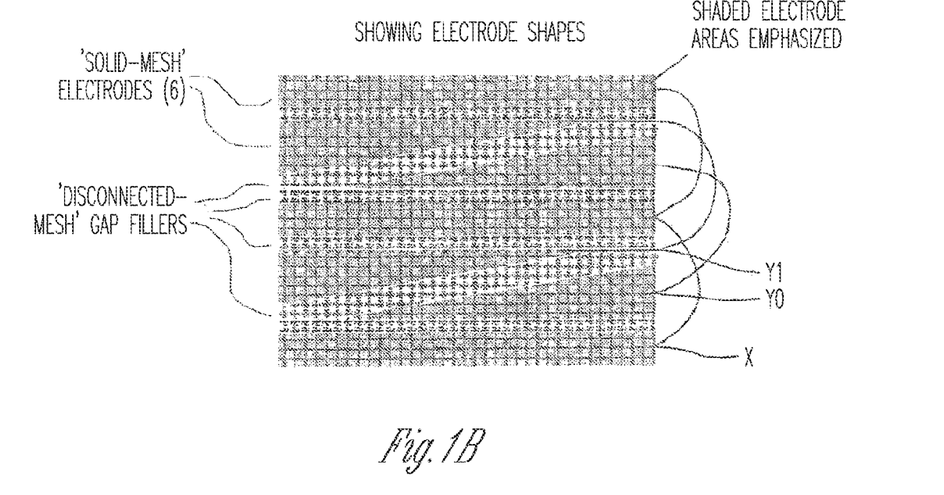
FIG. 1B shows the same pattern as in FIG. 1A, but with shading over the electrodes so as to aid the reader in viewing the electrode areas, for purposes of demonstration only.

FIG. 1B shows graphically the electrodes themselves using shading to outline the bars (X's) and triangles (Y's). The un-shaded areas are the gap filler regions which contain disconnected islands of material matched in areal density to the electrodes so as to provide for visual continuity.

Figure 2A:
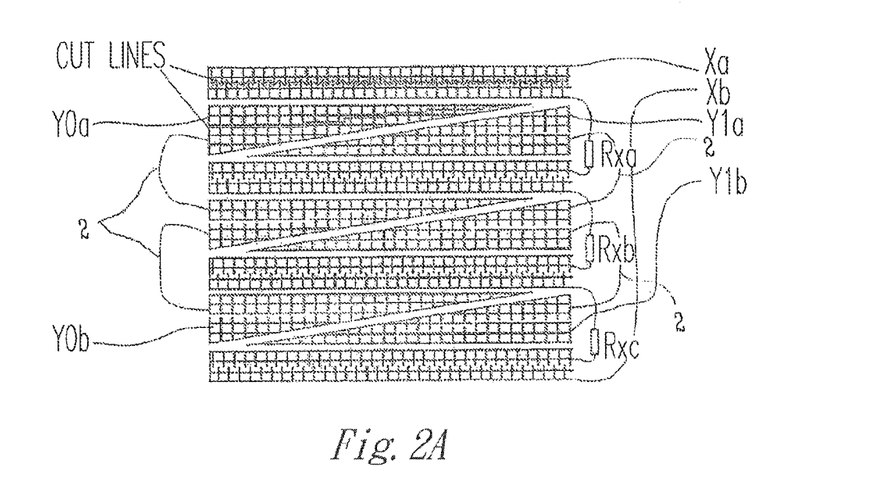
FIG. 2A shows a metal mesh configuration with self-test built in, using the loop-back principle.

Reliability of the electrodes is very important and may be compromised by micro-fractures of the electrodes or a defective metal printing process. Therefore, it is a preferred feature of the invention for electrical pathways of the electrode array to be tested from end to end. Using fine line connections and a split electrode technique, this can be readily accomplished, as shown in FIG. 2A and discussed below. Shown here is the same basic pattern as shown in FIG. 1A, however electrodes are cut in such a way as to create a 'U' shaped conduction path; the first X bar and first Y triangle in this figure have the cuts highlighted (cut lines). Each electrode also has two connections, one for each endpoint of the 'U'. In this way, an electrical current can be passed through each electrode shape to determine whether there is continuity or not. This is discussed further below.

FIG. 2A shows 'X' lines, where it is common practice to wire several electrodes together for the purpose of interpolation of the emitting field. Resistors are used (Rxa, Rxb, Rxc) to interconnect these electrodes in order to provide a potential gradient. For testing purposes, these resistors can be wired with split electrodes in such a way as to be able to test all the 'X' electrodes in one step with no added external connection count. As shown, lines Xa and Xb loop through the four X electrodes using three resistors (Rxa, Rxb, Rxc), so that if any one electrode has a failure, the electrical discontinuity and failure can be detected and the film and/or device rejected.

FIG. 2A shows a metal mesh configuration with self-test built in, using the loop-back principle. In the case of 'Y' lines Y0, Y1, it is typical that these are wired together as columns. In the case of FIG. 2A, there are two 'columns' of triangles, one left, and one right. In order to test the continuity of these triangles with a minimum of external connections, it is possible to take advantage of the fact that they are typically connected to each other anyway during use as a touch screen, by wiring the ends of the triangles in series. FIG. 2A shows lines Y0$a$, Y0$b$, and Y1$a$, Y1$b$; each pair being connected to its respective column using a series of connection of lines 2. By measuring continuity between the pair ends (i.e. between Y0$a$, Y0$b$, and Y1$a$, Y1$b$), all the triangles in a screen can be tested at the same time. This arrangement requires but one extra connection to the device per Y electrode set; in the case of FIG. 2A, there are therefore only two more connections to be made than normal.

It should also be noted that the arrangement shown in FIG. 2A can also be used to determine short circuits between adjacent ones of the electrodes, for example due to inadvertently deposited metal connecting an X electrode to a Y electrode. The manner of such testing should be obvious to one skilled in the art.

Using the method described above, the electrodes are sliced along their long axis and 'looped back' at the distal end from the connections, so that the touch screen processor can test the integrity of all the metal mesh electrodes, for short circuits as well as open circuits. Only a few added connection lines or test points are required to do this.

Figure 2B:
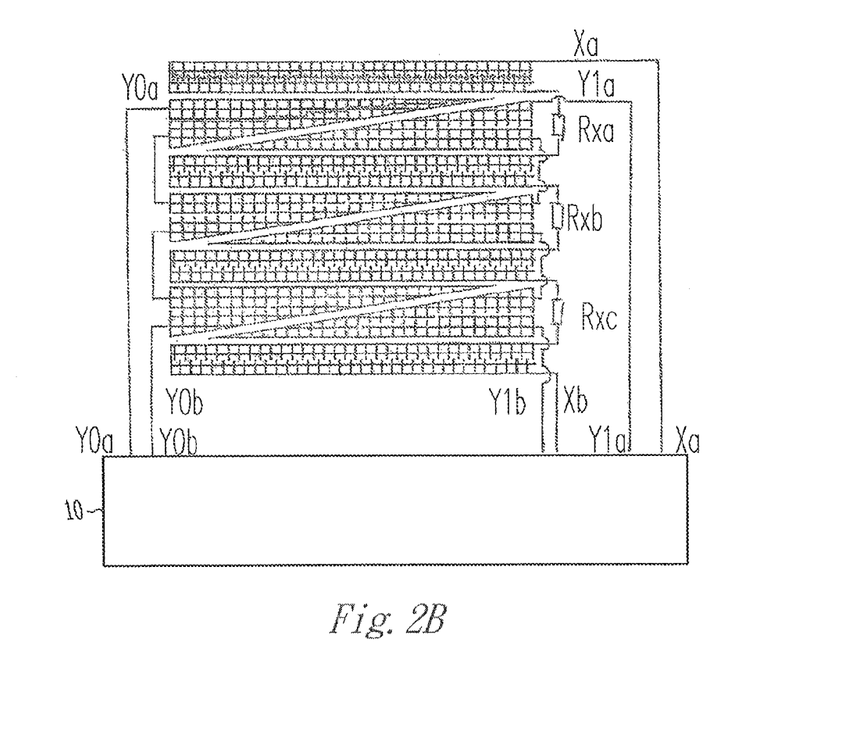
FIG. 2B shows the electrode pattern shown in FIG. 2A connected to a processor.

FIG. 2B shows the electrode arrangement shown in FIG. 2A connected to a processor 10. The processor 10 could be a purpose built testing processor or could be the same processor that is used to operate the electrode pattern in a touch screen for example. A testing processor could be used during manufacture to test if the electrode pattern contains any short circuits or open circuits that would result in poor or no operation of the electrode pattern when used as a part of a touch screen. If an open circuit or short circuit is detected during manufacture the electrode pattern could be discarded. Alternatively, a touch screen processor could test the electrode pattern during use, for example during start-up. If a short circuit or open circuit is detected in the electrode pattern, the user could be informed.

The processor shown in FIG. 2B is shown as a single microprocessor, but it will be appreciated that several separate circuits could be combined to form the processor, such as drive units, sense units including one or more ADCs and comparators. Each of the connections Y0$a$, Y0$b$, Y1$a$, Y1$b$, Xa and Xb of the processor 10 could be configured as inputs or outputs, or both depending on the test strategy that is used.

Figure 2C:
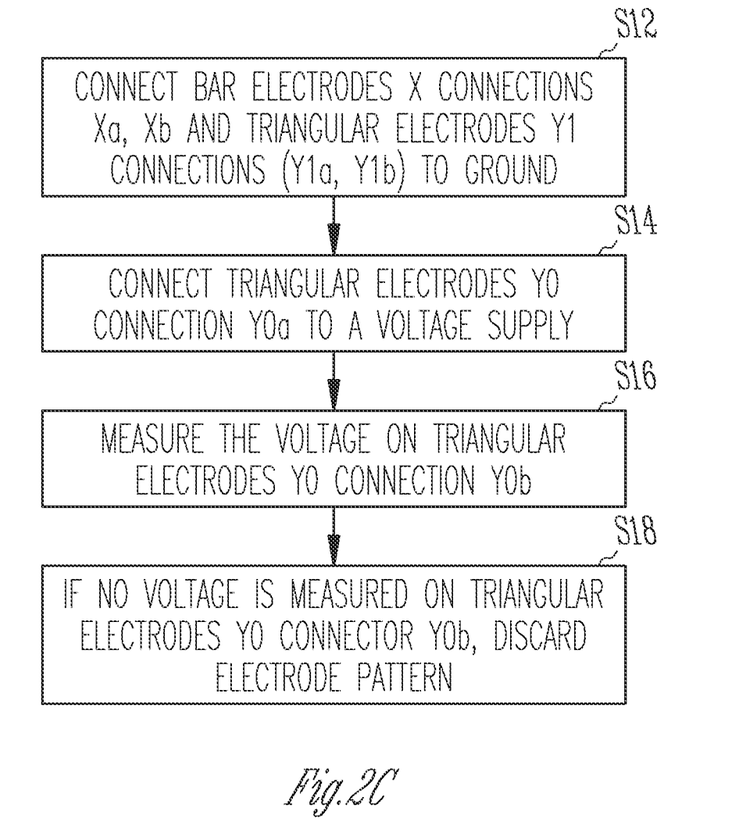
FIG. 2C shows a flow chart for testing continuity of the electrode pattern shown in FIG. 2A.
Figure 2D:
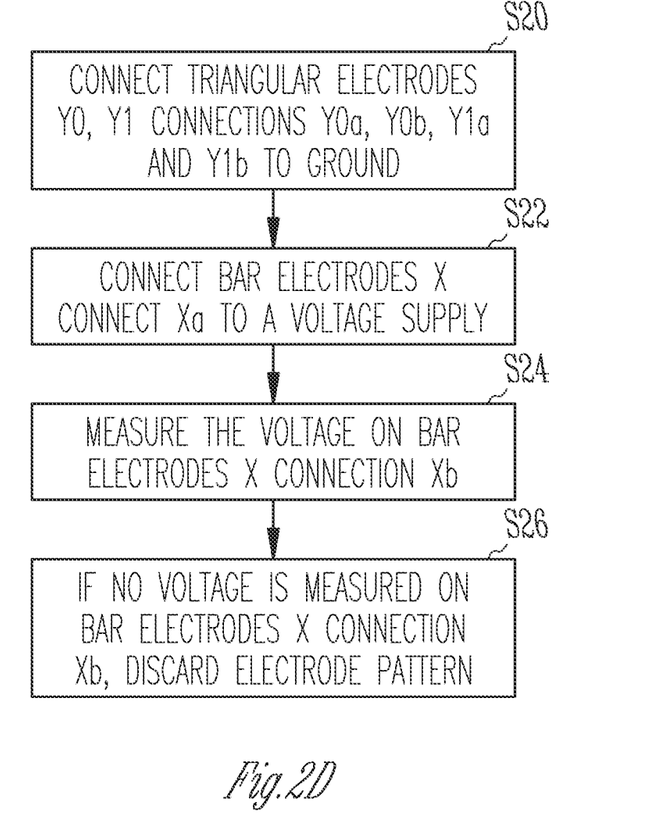
FIG. 2D shows a flow chart for testing continuity of the electrode pattern shown in FIG. 2A.

The presence of short and open circuits can be detected using the processor 10 with the steps shown in FIGS. 2C and 2D.

FIG. 2C shows the steps to test the triangular electrodes Y0. In step S12, the bar electrodes (i.e. connections Xa and Xb) and triangular electrodes Y1 (i.e. connections Y1$a$ and Y1$b$) are grounded. In step S14, a voltage is applied or connected to connection Y0$a$. In step S16, the voltage at connection Y0$b$ is detected or measured. In step S18, if there is no voltage detected or measured at connection Y0$b$, there is either an open circuit in the electrode pattern Y0 or there is a closed circuit to the bar electrodes X or the triangular electrodes Y1. That is to say if the voltage measured at connection Y0$b$ is anomalously low compared to the voltage applied to connection Y0$a$ no voltage is measured or detected.

To test the triangular electrodes Y1 the same steps are used as described above except the connections to triangular electrodes Y0 and Y1 are reversed. First, the bar electrodes (i.e. connections Xa and Xb) and triangular electrodes Y0 (i.e. connections Y0$a$ and Y0$b$) are grounded or connected to a ground connection. A voltage is then applied to Y1$a$. The voltage is then measured at connection Y1$b$. If there is no voltage detected at Y1$b$, there is either an open circuit in the electrode pattern Y1 or there is a closed circuit to the bar electrodes X or the triangular electrodes Y0. That is to say if the voltage measured at connection Y1$b$ is anomalously low compared to the voltage applied to connection Y1$a$ there is no voltage measured or detected at connection Y1$b$.

FIG. 2D shows the steps to test the bar electrodes X. In step S20, the triangular electrodes Y0, Y1 (i.e. connections Y0$a$, Y0$b$, Y1$a$ and Y1$b$) are grounded. In step S22, a voltage is applied or connected to connection Xa. In step S24, the voltage at connection Xb is measured. In step S26, if there is no voltage detected at connection Xb, there is either an open circuit in the electrode bar pattern X or there is a closed circuit to the triangular electrodes Y0, Y1. That is to say if the voltage measured at connection Xb is anomalously low compared to the voltage applied to connection Xa no voltage is measured or detected at connection Xb.

Furthermore, in order to test the resistors Rxa, Rxb, Rxc, a load resistor Rxd may be applied to terminal Xb to ground and the voltage across it measured in a final step. Rxd serves to produce a voltage that is inversely related to the resistance of the other three resistors in accordance with Ohm's law, so that their values can be ascertained to ensure they are correct within a predefined tolerance band.

It will be appreciated in the above, that the voltages could be equally applied to connections Xb, Y0$b$ or Y1$b$ respectively and the voltage detected at Xa, Y0$a$ and Y1$a$ respectively. If the resistors Rxa, Rxb, Rxc are optionally tested using the method described above resistor Rxb would be connected to terminal Xa to ground.

Figure 3A:
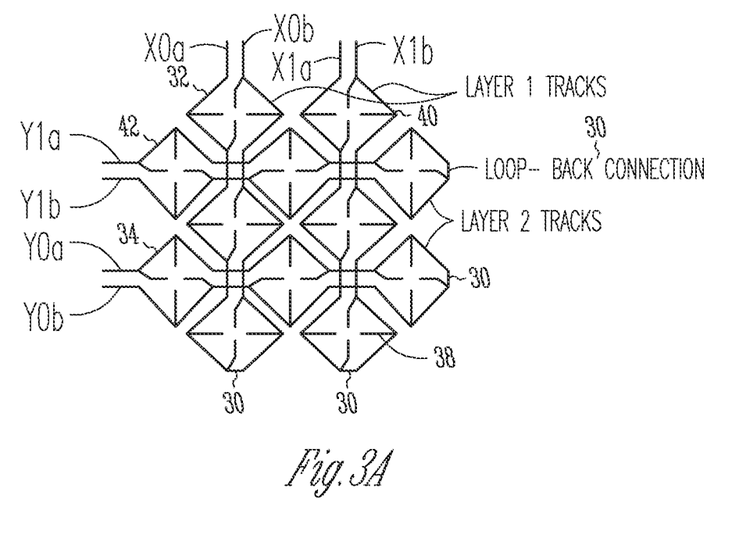
FIG. 3A shows a 2-layer diamond pattern (or a 1-layer pattern with cross-overs) implemented using the method, including the use of self-test loop back paths.

FIG. 3A shows a more conventional 2-layer geometry of electrodes composed of diamond patterns as is well known in the art, but formed from an outline of the electrode shapes using fine line metal. With this pattern there are vertical columns 32, 40 and horizontal rows 34, 42 of diamonds which are interconnected so as to form an interleaved electrode set in both the x and y axis. Some in-fill is used to increase the effective surface area as shown, using inward 'spikes' of metal 38 emanating from each corner. This figure shows both layers superimposed, however it should be understood that there is an insulating layer between the vertical and horizontal sets of diamond-shaped electrodes. As with FIG. 2A, the electrode sets have two connections each and a loop-back structure 30 that permits testing for continuity and short circuits.

Figure 3B:
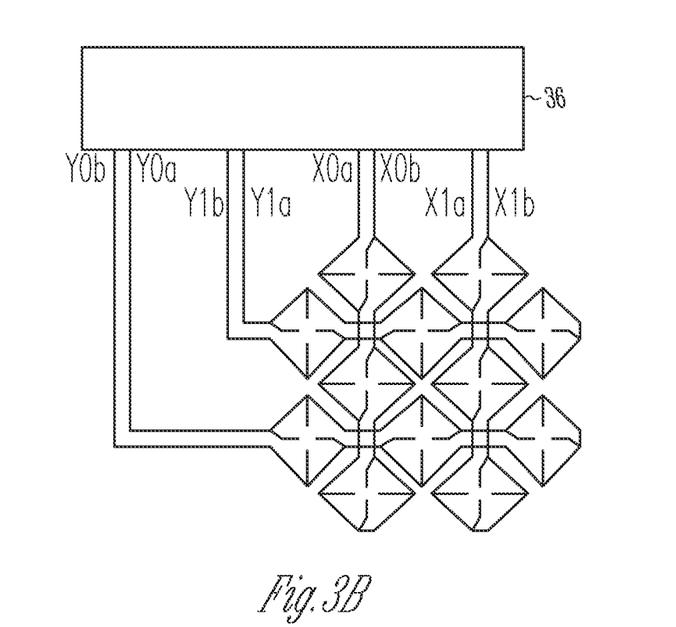
FIG. 3B shows the electrode pattern shown in FIG. 3A connected to a processor.

FIG. 3B shows the electrode arrangement shown in FIG. 3A connected to a processor 36. The processor 36 is similar in structure and operation to the processor shown in FIG. 2A.

The test strategy shown in FIGS. 2C and 2D can be applied to the electrode pattern shown in FIG. 3B using the processor 36. For example, to test vertical column electrode 32, the connections (X1$a$, X1$b$, Y0$a$, Y0$b$, Y1$a$ and Y1$b$) of the other electrodes are connected to ground. A voltage is applied or connected to connection X0$a$ and then the voltage at connection X0$b$ is measured. If there is no voltage measured at connection Xb, there is either an open circuit in the vertical column electrode 32 or there is a short circuit to one of the other electrodes. That is to say if the voltage measured at connection Xb is anomalously low compared to the voltage applied to connection Xa no voltage is measured or detected at connection Xb.

Figure 4A:
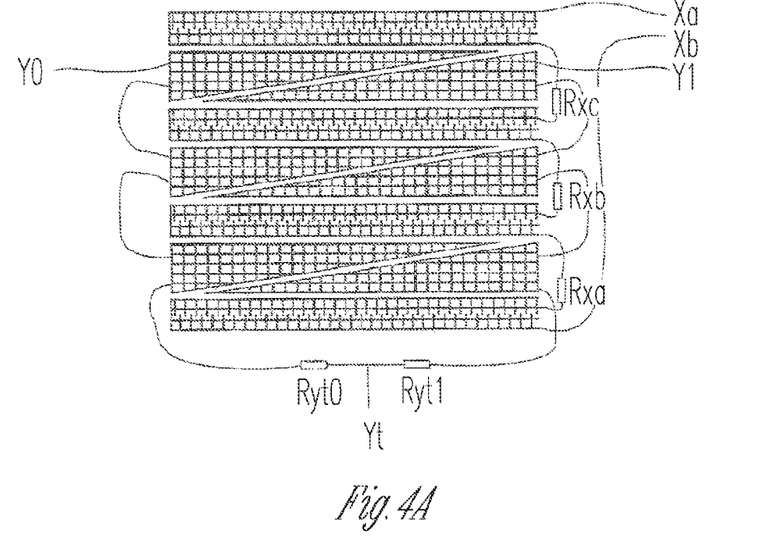
FIG. 4A shows the same pattern as FIG. 2A, but with two termination resistors on the Y lines, which offers a method to reduce the connection count to the electrodes for self-test purposes.

FIG. 4A shows a method of reducing the required number of added external connections required to perform the loopback test on the 'Y' lines with regard to the electrode pattern of FIG. 2A. Resistors Ryt0 and Ryt1 are added to the endpoints of each set of Y triangles, and connected together to form connection Yt. This eliminates one of the Y line end-wires for each pair of Y triangle sets. The resistors are preferably of a high value so as not to cause interference with the sensing function of the electrodes. For example, the resistors can be 100 KΩ or greater.

Figure 4B:
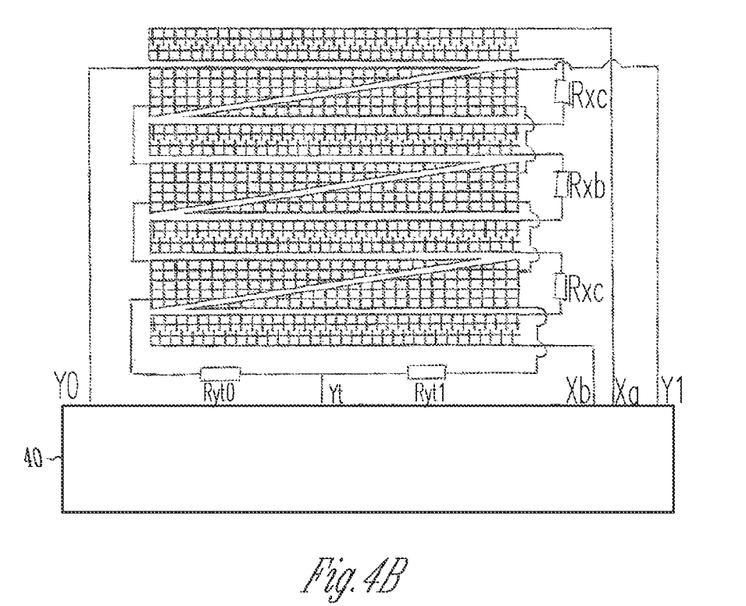
FIG. 4B shows the electrode pattern shown in FIG. 4A connected to a processor.

FIG. 4B shows the electrode pattern shown in FIG. 4A connected to processor 40. The processor 40 is similar in structure and operation to that described for the processor shown in FIG. 2B. However, as described above there is a reduced number of connections, namely connections Y0b and Y1b are replaced by a single connection Yt.

The testing strategy for testing the bar electrodes is similar to that shown in the flow chart in FIG. 2D. For example, connections Yt, Y0 and Y1 are all connected to ground. A voltage is then applied to connection Xa. The voltage is then measured at Xb. If there no voltage measured at connection Xb, there is either an open circuit in the bar electrode pattern or there is a closed circuit to the triangular electrodes. That is to say if the voltage measured at connection Xb is anomalously low compared to the voltage applied to connection Xa no voltage is measured or detected at connection Xb.

The test procedure for testing the Y lines of FIG. 4A involves:
1) ground all X connections, then,
2) put a voltage on connection Yt, then,
3) measure the voltage on each of Y0 and Y1, then,
4) ground Y0 while holding the voltage on Yt, then,
5) measure the output of Y1.

If in step 3 there is no voltage on either Y0 or Y1, there is a fault, either due to a short circuit from a Y electrode to an X electrode or an open circuit in the Y electrode pattern. If in step 5 there is no voltage on Y1, there is a short circuit between Y1 and Y0. The above sequence tests all known combinations of possible faults.

Figure 4C:
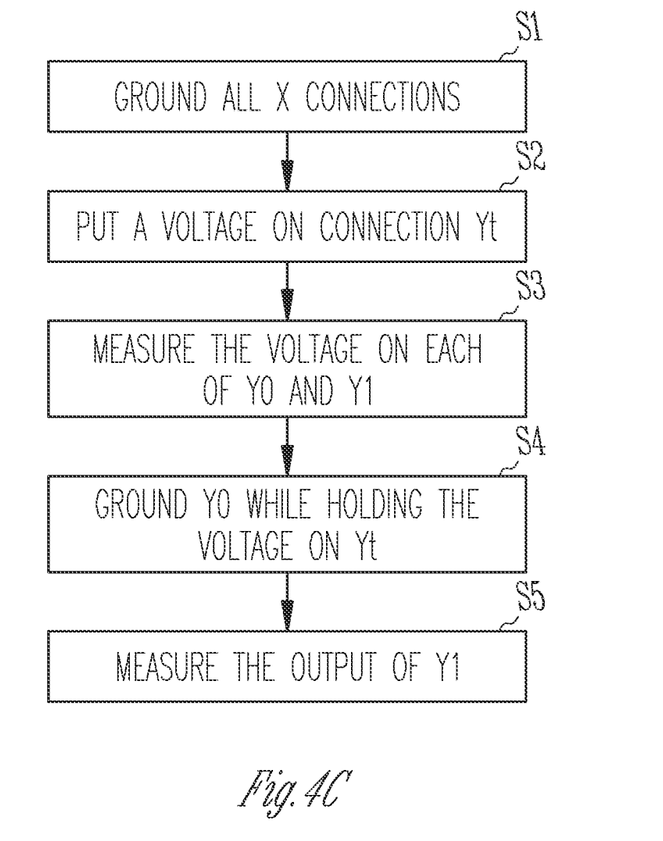
FIG. 4C shows a flow chart for testing continuity of the electrode pattern shown in FIG. 4A.

The steps described above for testing the Y lines are summarized in Steps S1 to S5 in FIG. 4C. It will be appreciated that after steps 3 or 5 (i.e. S3 or S5) above the electrode pattern could be discarded. That is to say if the voltage measured on connection Y0 or Y1 in step 3, or Y1 in step 5 is anomalously low compared to the voltage applied to connection Yt in step 2 or 4, the electrode pattern is considered to have failed and could be discarded, otherwise the sensor baring the electrode pattern is deemed to have passed.

The invention can also be used to make resistive screens and electroluminescent (EL) lamps, because the metal density is high enough that these applications can still function but with enhanced transparency when compared with ITO or PEDOT based electrodes.

Different sensing techniques may be employed with the invention to determine changes in capacitance and the presence or absence of a user in proximity with the touch sensor. For example, the apparatus and methods described in U.S. Pat. No. 6,466,036 and U.S. Pat. No. 6,452,514 may each be employed with the invention and are incorporated herein in their entirety.

What is claimed is:

1. A two-dimensional touch sensor comprising:
a plurality of electrodes arranged in a pattern on a substrate, each electrode being formed of an interconnected mesh of metal traces, the metal being intrinsically opaque, the metal traces being sufficiently narrow such that the mesh is imperceptible to an untrained eye, the interconnected mesh of metal traces comprising a plurality of first conductive lines and a plurality of second conductive lines, the plurality of first conductive lines and the plurality of second conductive lines of the mesh of a particular electrode being disposed on a first layer of the substrate, wherein at least one of the first conductive lines of the mesh of the particular electrode electrically contacts one of the second conductive lines of the mesh of the particular electrode at an intersection, wherein:
the plurality of electrodes are arranged on a single side of the substrate; and
the plurality of electrodes comprises:
a plurality of x-axis electrodes; and
a plurality of y-axis electrodes; and
a plurality of islands formed of another interconnected mesh of metal traces that are sufficiently narrow such that the mesh of the plurality of islands is imperceptible to the untrained eye, each island being electrically disconnected from the plurality of electrodes, each island being located between one of the x-axis electrodes and one of the y-axis electrodes.

2. The two-dimensional sensor of claim 1, wherein the metal traces of the plurality of electrodes have a width less than or equal to 10 μm.

3. The two-dimensional sensor of claim 1, wherein the metal traces of the plurality of electrodes occupy less than or equal to 5% of the area of each electrode.

4. The two-dimensional sensor of claim 1, wherein the electrodes are arranged in a single layer.

5. The two-dimensional sensor of claim 1, wherein the electrodes are arranged in two layers separated by a dielectric.

6. The two-dimensional touch sensor of claim 1, wherein each electrode is subdivided into upper and lower parts, the metal traces from the upper and lower parts being connected only at a distal end of the electrode, the metal traces in the upper part being disconnected from the metal traces in the lower part from the distal end to first and second proximal ends of the electrode.

7. A method of manufacturing a capacitive touch sensor, the method comprising:
providing a substrate;
depositing a plurality of electrodes on at least one side of the substrate, each electrode being formed of an interconnected mesh of metal traces, the metal being intrinsically opaque, the metal traces being sufficiently narrow such that the mesh is imperceptible to an untrained eye, the interconnected mesh of metal traces comprising a plurality of first conductive lines and a plurality of second conductive lines, the plurality of first conductive lines and the plurality of second conductive lines of the mesh of a particular electrode being disposed on a first layer of the substrate, wherein at least one of the first conductive lines of the mesh of the particular electrode electrically contacts one of the second conductive lines of the mesh of the particular electrode at an intersection, wherein:
the plurality of electrodes are arranged on a single side of the substrate; and
the plurality of electrodes comprises:
a plurality of x-axis electrodes; and
a plurality of y-axis electrodes; and
depositing on the substrate a plurality of islands formed of another interconnected mesh of metal traces that are sufficiently narrow such that the mesh of the plurality of islands is imperceptible to the untrained eye, each island being electrically disconnected from the plurality of electrodes, each island located between one of the x-axis electrodes and one of the y-axis electrodes.

8. The method of claim 7, wherein the metal traces of the plurality of electrodes have a width less than or equal to 10 µm.

9. The method of claim 7, wherein the metal traces of the plurality of electrodes occupy less than or equal to 5% of the area of each electrode.

10. The method of claim 7, wherein each electrode is subdivided into upper and lower parts, the metal traces from the upper and lower parts being connected only at a distal end of the electrode, the metal traces in the upper part being disconnected from the metal traces in the lower part from the distal end to first and second proximal ends of the electrode.

11. The method of claim 10, further comprising:
applying a first voltage to the first proximal end of one of the plurality of electrodes while connecting the proximal ends of all other electrodes to ground;
measuring a second voltage at the second proximal end of the one electrode;
repeating the previous step for all other electrodes;
failing the sensor if the second voltage is anomalously low compared to the first voltage for any of the electrodes; and
passing the sensor if the second voltage is not anomalously low compared to the first voltage for any of the electrodes.

12. An apparatus comprising:
a substrate;
a plurality of electrodes arranged in a pattern on the substrate, each electrode being formed of an interconnected mesh of metal traces, the metal being intrinsically opaque, the metal traces being sufficiently narrow such that the mesh is imperceptible to an untrained eye, the interconnected mesh of metal traces comprising a plurality of first conductive lines and a plurality of second conductive lines, the plurality of first conductive lines and the plurality of second conductive lines of the mesh of a particular electrode being disposed on a first layer of the substrate, wherein at least one of the first conductive lines of the mesh of the particular electrode electrically contacts one of the second conductive lines of the mesh of the particular electrode at an intersection, wherein:
the plurality of electrodes are arranged on a single side of the substrate; and
the plurality of electrodes comprises:
a plurality of x-axis electrodes; and
a plurality of y-axis electrodes;
a plurality of islands formed of another interconnected mesh of metal traces that are sufficiently narrow such that the mesh of the plurality of islands is imperceptible to the untrained eye, each island being electrically disconnected from the plurality of electrodes, each island being located between one of the x-axis electrodes and one of the y-axis electrodes; and
a processor communicatively coupled to the plurality of electrodes.

13. The apparatus of claim 12, wherein the metal traces of the plurality of electrodes have a width less than or equal to 10 µm.

14. The apparatus of claim 12, wherein the metal traces of the plurality of electrodes occupy less than or equal to 5% of the area of each electrode.

15. The apparatus of claim 12, wherein the electrodes are arranged in a single layer.

16. The apparatus of claim 12, wherein the electrodes are arranged in two layers separated by a dielectric.

17. The apparatus of claim 12, wherein each electrode is subdivided into upper and lower parts, the metal traces from the upper and lower parts being connected only at a distal end of the electrode, the metal traces in the upper part being disconnected from the metal traces in the lower part from the distal end to first and second proximal ends of the electrode.

18. A two-dimensional touch sensor comprising:
a plurality of electrodes arranged in a pattern on a substrate, each electrode being formed of an interconnected mesh of metal traces, the metal being intrinsically opaque, the metal traces having a width less than or equal to 10 µm, the interconnected mesh of metal traces comprising a plurality of first conductive lines and a plurality of second conductive lines, the plurality of first conductive lines and the plurality of second conductive lines of the mesh of a particular electrode being disposed on a first layer of the substrate, wherein at least one of the first conductive lines of the mesh of the particular electrode electrically contacts one of the second conductive lines of the mesh of the particular electrode at an intersection, wherein:
the plurality of electrodes are arranged on a single side of the substrate;
the plurality of electrodes comprises:
a plurality of x-axis electrodes; and
a plurality of y-axis electrodes; and
the two-dimensional touch sensor further comprises a plurality of islands formed of another interconnected mesh of metal traces that have a width less than or equal to 10 µm, each island being electrically disconnected from the plurality of electrodes, each island being located between one of the x-axis electrodes and one of the y-axis electrodes.

19. The two-dimensional sensor of claim 18, wherein the metal traces of the plurality of electrodes occupy less than or equal to 5% of the area of each electrode.

20. The two-dimensional sensor of claim 18, wherein the electrodes are arranged in a single layer.

21. The two-dimensional sensor of claim 18, wherein the electrodes are arranged in two layers separated by a dielectric.

22. The two-dimensional touch sensor of claim 18, wherein adjacent electrodes are spaced apart by a plurality of islands also made of interconnected metal traces, the metal traces of the islands being visually and electrically similar to the metal traces of the electrodes.

23. The two-dimensional touch sensor of claim 18, wherein each electrode is subdivided into upper and lower parts, the metal traces from the upper and lower parts being connected only at a distal end of the electrode, the metal traces in the upper part being disconnected from the metal traces in the lower part from the distal end to first and second proximal ends of the electrode.

24. The two-dimensional touch sensor of claim 23, wherein:
the second proximal end of each x-axis electrode is electrically connected to the first proximal end of the adjacent x-axis electrode via a resistive element; and
the second proximal end of each y-axis electrode is electrically connected to the first proximal end of the adjacent y-axis electrode.

25. The two-dimensional sensor of claim 18, wherein each of the plurality of electrodes are subdivided into an upper part and a lower part, the upper and lower parts of each electrode being electrically disconnected from each other except at a distal end of the electrode.

26. The two-dimensional sensor of claim 18, wherein each of the plurality of x-axis electrodes are electrically coupled together and each of the plurality of y-axis electrodes are electrically coupled together.

27. A method of manufacturing a capacitive touch sensor, the method comprising:
providing a substrate;
depositing a plurality of electrodes on at least one side of the substrate, each electrode being formed of an interconnected mesh of metal traces, the metal being intrinsically opaque, the metal traces having a width less than or equal to 10 µm, the interconnected mesh of metal traces comprising a plurality of first conductive lines and a plurality of second conductive lines, the plurality of first conductive lines and the plurality of second conductive lines of the mesh of a particular electrode being disposed on a first layer of the substrate, wherein at least one of the first conductive lines of the mesh of the particular electrode electrically contacts one of the second conductive lines of the mesh of the particular electrode at an intersection, wherein:
the plurality of electrodes are arranged on a single side of the substrate; and
the plurality of electrodes comprises:
a plurality of x-axis electrodes; and
a plurality of y-axis electrodes; and
depositing on the substrate a plurality of islands formed of another interconnected mesh of metal traces that have a width less than or equal to 10 µm, each island being electrically disconnected from the plurality of electrodes, each island being located between one of the x-axis electrodes and one of the y-axis electrodes.

28. The method of claim 27, wherein the metal traces of the plurality of electrodes occupy less than or equal to 5% of the area of each electrode.

29. The method of claim 27, wherein each electrode is subdivided into upper and lower parts, the metal traces from the upper and lower parts being connected only at a distal end of the electrode, the metal traces in the upper part being disconnected from the metal traces in the lower part from the distal end to first and second proximal ends of the electrode.

30. The method of claim 29, further comprising:
applying a first voltage to the first proximal end of one of the plurality of electrodes while connecting the proximal ends of all other electrodes to ground;
measuring a second voltage at the second proximal end of the one electrode;
repeating the previous step for all other electrodes;
failing the sensor if the second voltage is anomalously low compared to the first voltage for any of the electrodes; and
passing the sensor if the second voltage is not anomalously low compared to the first voltage for any of the electrodes.

31. An apparatus comprising:
a substrate;
a plurality of electrodes arranged in a pattern on the substrate, each electrode being formed of an interconnected mesh of metal traces, the metal being intrinsically opaque, the metal traces having a width less than or equal to 10 µm, the interconnected mesh of metal traces comprising a plurality of first conductive lines and a plurality of second conductive lines, the plurality of first conductive lines and the plurality of second conductive lines of the mesh of a particular electrode being disposed on a first layer of the substrate, wherein at least one of the first conductive lines of the mesh of the particular electrode electrically contacts one of the second conductive lines of the mesh of the particular electrode at an intersection; and
a processor communicatively coupled to the plurality of electrodes;
wherein:
the plurality of electrodes comprises:
a plurality of x-axis electrodes arranged on a particular side of the substrate; and
a plurality of y-axis electrodes arranged on the same particular side of the substrate as the plurality of x-axis electrodes; and
the apparatus further comprises a plurality of islands formed of another interconnected mesh of metal traces that have a width less than or equal to 10 µm, each island being electrically disconnected from the plurality of x-axis and y-axis electrodes, each island being located between one of the x-axis electrodes and one of the y-axis electrodes on the same particular side of the substrate as the plurality of x-axis and y-axis electrodes.

32. The apparatus of claim 31, wherein the metal traces of the plurality of electrodes occupy less than or equal to 5% of the area of each electrode.

33. The apparatus of claim 31, wherein the electrodes are arranged in a single layer.

34. The apparatus of claim 31, wherein the electrodes are arranged in two layers separated by a dielectric.

35. The apparatus of claim 31, wherein each electrode is subdivided into upper and lower parts, the metal traces from the upper and lower parts being connected only at a distal end of the electrode, the metal traces in the upper part being disconnected from the metal traces in the lower part from the distal end to first and second proximal ends of the electrode.

36. A two-dimensional touch sensor comprising:
a plurality of electrodes arranged in a pattern on a substrate, each electrode being formed of an interconnected mesh of metal traces, the metal being intrinsically opaque, the metal traces having a width less than or equal to 10 µm, the interconnected mesh of metal traces comprising a plurality of first conductive lines and a plurality of second conductive lines, the plurality of first conductive lines and the plurality of second conductive lines of the mesh of a particular electrode being disposed on a first layer of the substrate, wherein at least one of the first conductive lines of the mesh of the particular electrode electrically contacts one of the second conductive lines of the mesh of the particular electrode at an intersection, wherein:
the plurality of electrodes are arranged on a single side of the substrate; and
the pattern comprises:
a first electrode in the shape of a horizontal bar;
a second electrode in the shape of a triangle, the second electrode extending from a first edge of the pattern; and
an island formed of another interconnected mesh of metal traces that have a width less than or equal to 10 µm, the island being electrically disconnected from the first and second electrodes.

37. The two-dimensional sensor of claim 36, wherein the pattern further comprises a third electrode in the shape of a triangle, the third electrode extending from a second edge of the pattern that is opposite from the first edge.

* * * * *